(12) United States Patent
Statham

(10) Patent No.: US 9,883,681 B2
(45) Date of Patent: Feb. 6, 2018

(54) WASH AWAY FILLET TOOL

(71) Applicant: Rodney Earl Statham, Crosby, TX (US)

(72) Inventor: Rodney Earl Statham, Crosby, TX (US)

( * ) Notice: Subject to any disclaimer, the term of this patent is extended or adjusted under 35 U.S.C. 154(b) by 0 days.

(21) Appl. No.: 15/459,312

(22) Filed: Mar. 15, 2017

(65) Prior Publication Data

US 2017/0265489 A1 Sep. 21, 2017

Related U.S. Application Data

(60) Provisional application No. 62/310,678, filed on Mar. 19, 2016.

(51) Int. Cl.
*A22C 25/16* (2006.01)
*A22C 25/06* (2006.01)
*B08B 3/02* (2006.01)

(52) U.S. Cl.
CPC ................ *A22C 25/06* (2013.01); *B08B 3/02* (2013.01)

(58) Field of Classification Search
CPC ................................ A01K 97/00; A01K 99/00
USPC ...... 452/194–196, 185, 173; 43/56, 1, 4, 4.5
See application file for complete search history.

(56) References Cited

U.S. PATENT DOCUMENTS

| | | | |
|---|---|---|---|
| 4,454,628 A * | 6/1984 | Olson | A22C 25/06 452/194 |
| 4,766,621 A | 8/1988 | Rasor | |
| 4,935,991 A | 6/1990 | Tourney | |
| 6,200,212 B1 * | 3/2001 | Henry | A01K 97/04 43/56 |
| 7,390,249 B2 * | 6/2008 | Sorey | A22C 25/025 452/195 |
| 7,625,268 B2 * | 12/2009 | Durjan | A22C 25/025 452/103 |
| 8,677,522 B2 * | 3/2014 | Aykens | E03C 1/048 239/106 |
| 9,085,884 B2 * | 7/2015 | Lopchinsky | E03C 1/186 |
| 2003/0096569 A1 * | 5/2003 | Britton | A22C 25/06 452/194 |
| 2006/0240758 A1 * | 10/2006 | Sorey | A22C 25/06 452/195 |

* cited by examiner

*Primary Examiner* — Richard Price, Jr.

(57) ABSTRACT

The wash away fillet tool is a new cutting board utensil designed primarily to be used to fillet fish; although, it could be used for other similar jobs. The design is a straightforward improvement of the cutting board which makes the job of filleting fish safer, cleaner, and faster. A water chamber attached to a cutting board is the key part. The water chamber permits water to flow across the working surface of the fillet tool. The flow of water washes undesirable waste material off of the fillet tool keeping the hands and knife free of fish slime.

5 Claims, 10 Drawing Sheets

Figure 4:
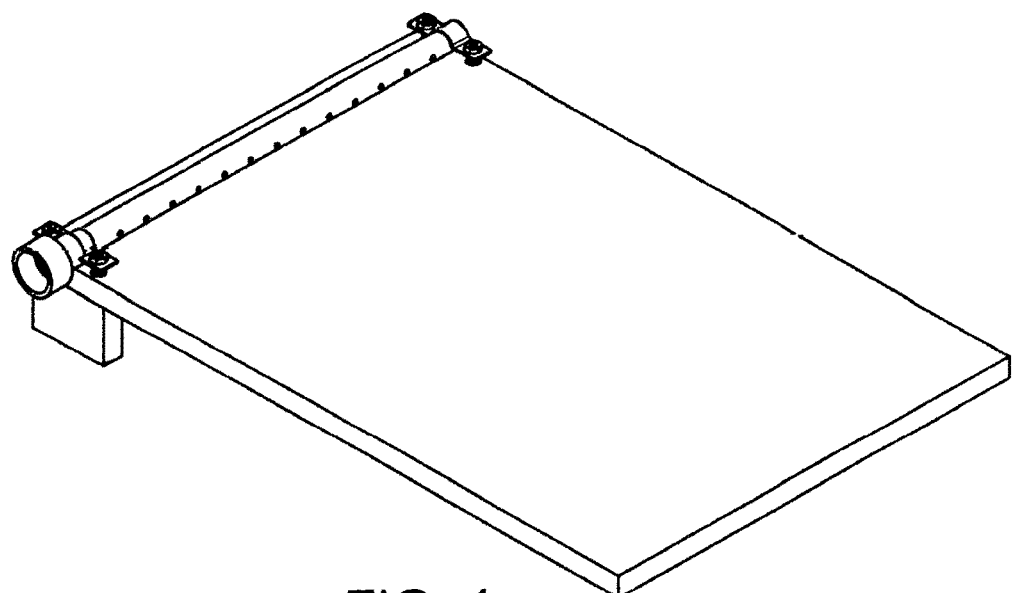

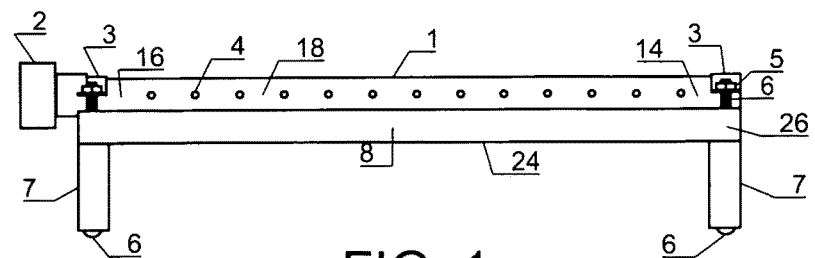
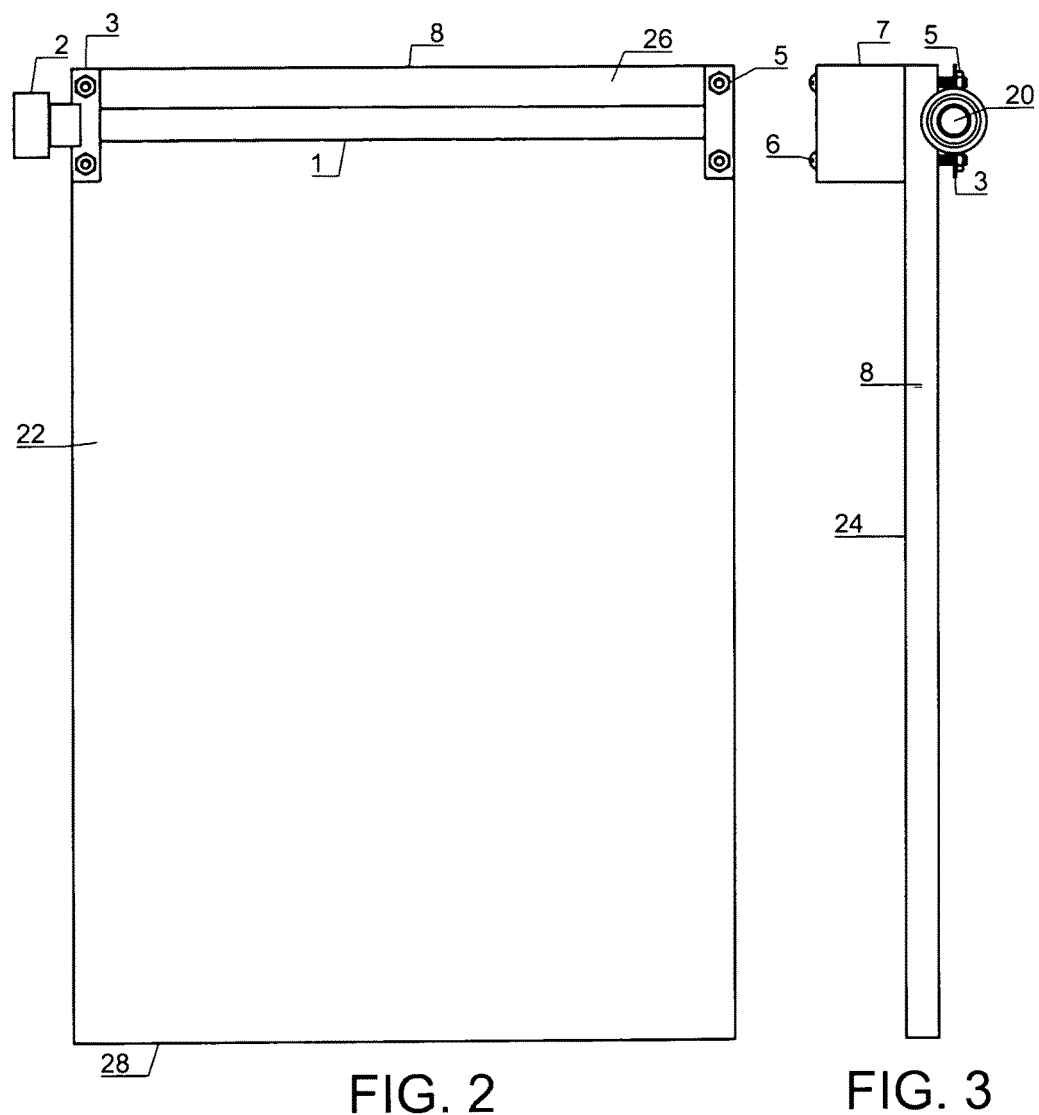
FIG. 1
FIG. 2
FIG. 3

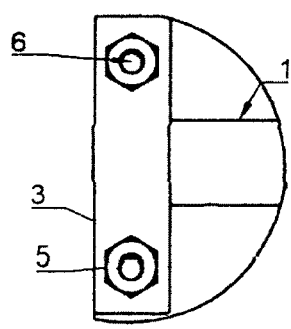
6A
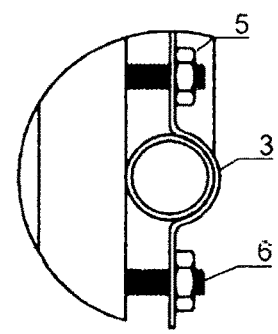
7A
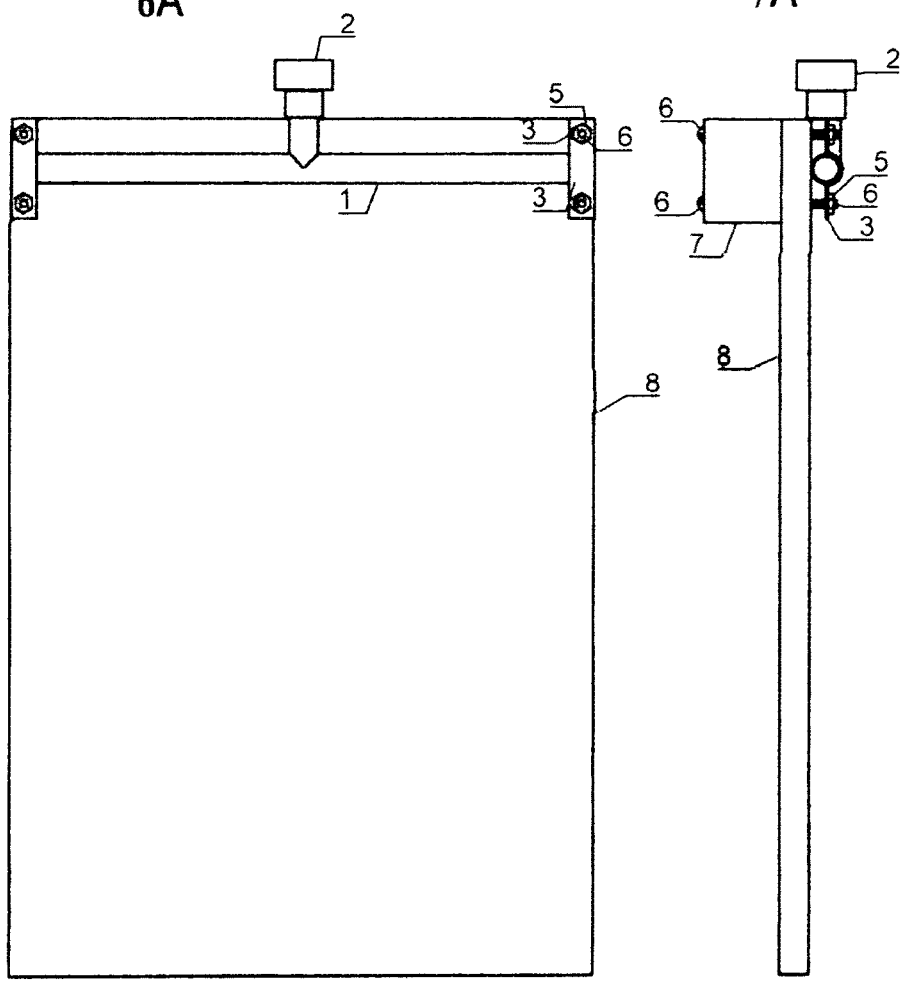
FIG. 6  FIG. 7

WASH AWAY FILLET TOOL

CROSS-REFERENCE TO RELATED APPLICATIONS

Provisional utility patent application No. 62/310,678 Filed Mar. 19, 2016

BACKGROUND

The field of endeavor is the process of preparing fish for food using a cutting board and knife. The process is generally known as filleting. Filleting fish involves removing the head, bones, fish slime, blood, guts, and feces; hence, waste. This process is done by hand with a knife on a cutting board. Waste accumulates on the hands, the knife, and the cutting board during the cleaning and filleting process. This waste must be removed after filleting only one or two fish because the waste creates three problems.
1. Safety because the fish slime causes the hands, knife, and cutting board to get slippery thus difficult to control. This condition creates personal hazards such as potential knife cuts and fin punctures.
2. Food contamination because the waste is foul and will contaminate the food if not removed.
3. Poor productivity because stopping to remove the accumulated waste is time consuming
4. There is a forth problem to solve and that is cost. All known prior art is complex and expensive to manufacture; therefore, unaffordable for the general public.

PRIOR ART

U.S. Pat. No. 4,454,628 Specification column 1 line 66-68 identify the solution; however the invention is inadequate due to the design features of slats and cross members, because these feature easily get stopped up with waste. The problem is not solved but rather exacerbated. The crevices created by the slats and cross members quickly become plugged and stopped up with waste causing the process to have to be halted more often than if they had not been introduced. Furthermore, complex design with the vacuum molded aluminum body, slats and cross members, hook shaped legs, and folding legs, make it costly to manufacture.

U.S. Pat. No. 7,625,268B2 presents a complex solution which is also inadequate. Handling the numerous implements adds time and unnecessary motion to the cleaning process. The complex design makes manufacture costly.
The Fish Cleaning Table
T. J. Kiefer TNT Boat Works 3207 Industrial 25th St, Ft Pierce, Fla. 34946
Prior art search discovered no Patent Application or Patent.

This fish cleaning table is offered for sale on line by TNT Boat Works as a custom item. It uses water sprayed on to the surface of the table but the water is sprayed directly toward the person which sprays the mess toward the person. It is a permanently mounted table and is not affordable for the average consumer.

BRIEF SUMMARY OF THE WASH AWAY FILLET TOOL

The object of the Wash Away Fillet Tool is twofold.
First to improve the cutting board used in the process of filleting fish by solving the aforementioned first three problems making filleting fish safer, cleaner and more efficient.

This is accomplished by providing a constant flow of water to remove the waste. The constant removal of waste eliminates the need to stop cleaning fish to clean the hands, the knife and cutting board. The fillets are also rinsed as they are cut free; thus, all three primary problems are completely solved.

The second object is to make The Wash Away Fillet Tool affordable to the general public.

This is accomplished by using common materials that are readily available and easy to assemble and it takes a short time to assemble; hence, low material costs plus low labor cost equals a useful, affordable, novel, filleting tool.

BRIEF DESCRIPTION OF A SEVERAL VIEWS

Figure 5:
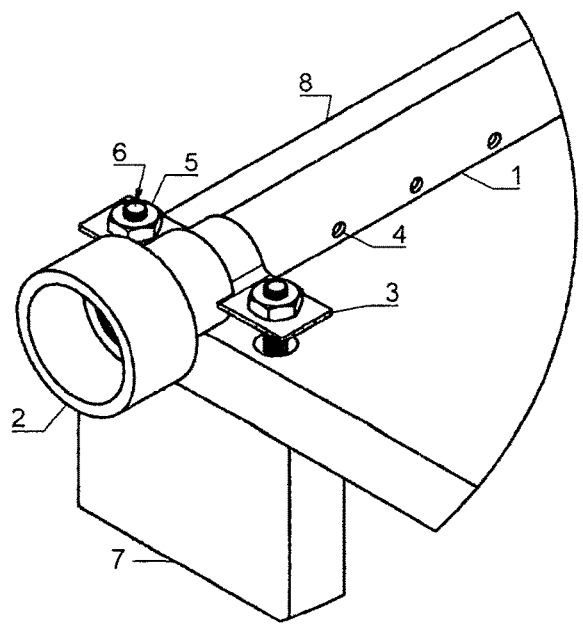
Figure 8:
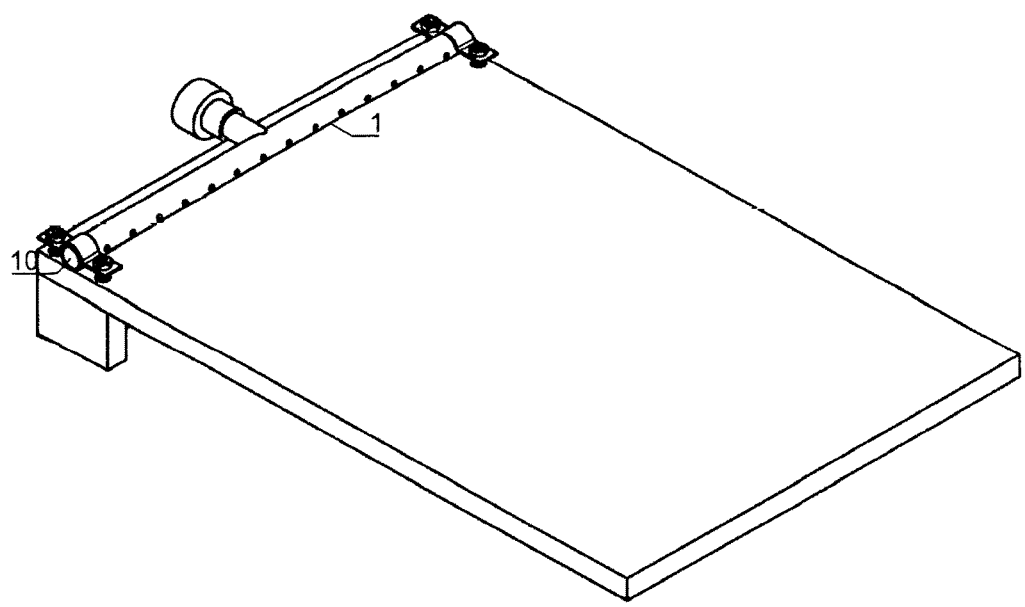
Figure 9:
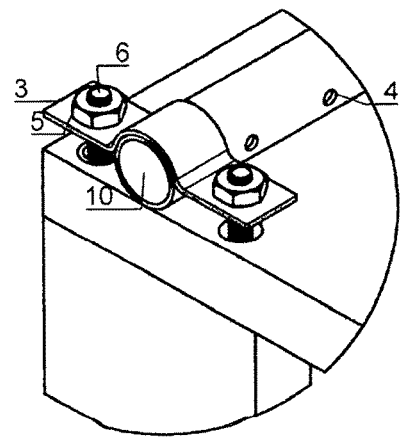
Figure 10:
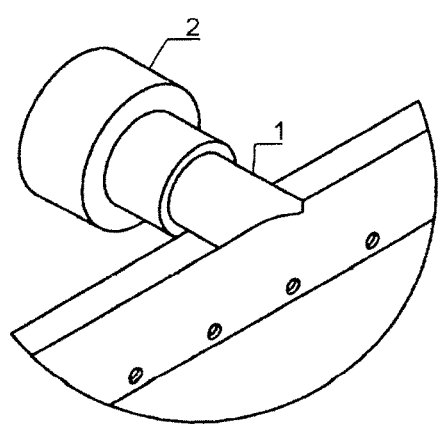
Figure 11:
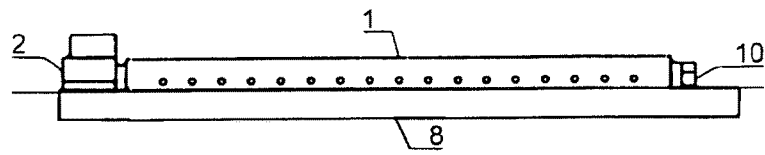
Figure 12:
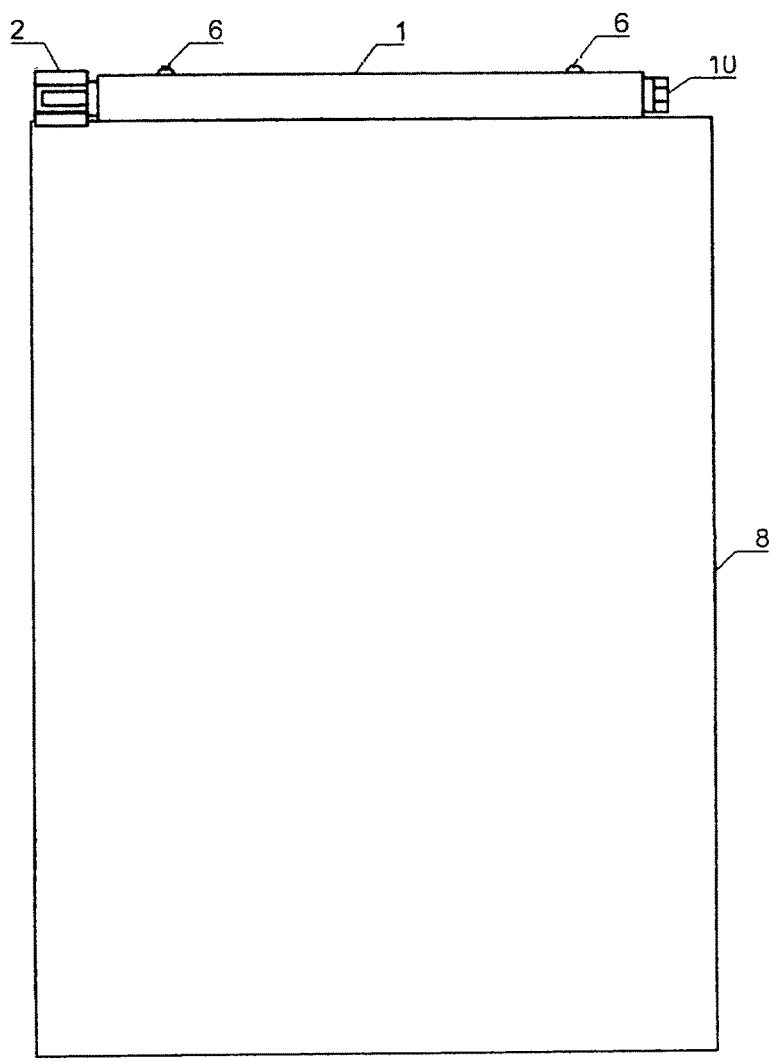
Figure 13:
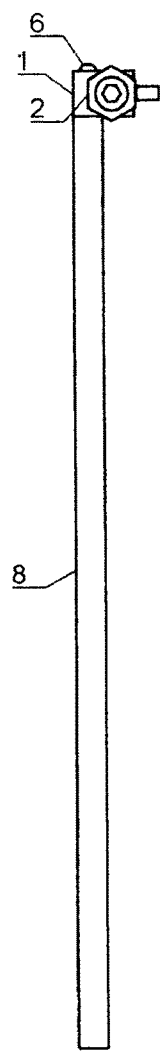
Figure 14:
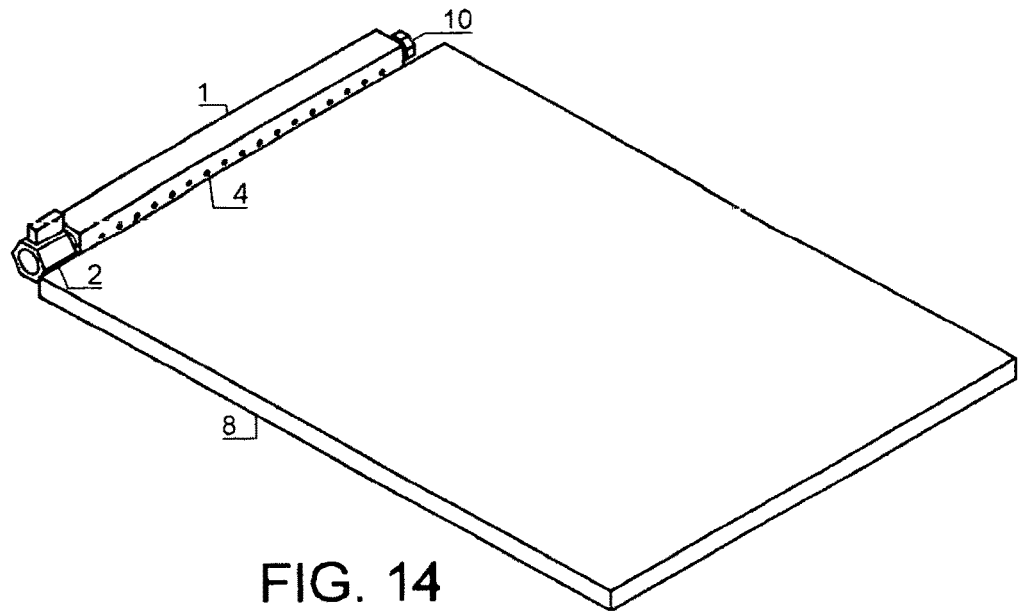
Figure 15:
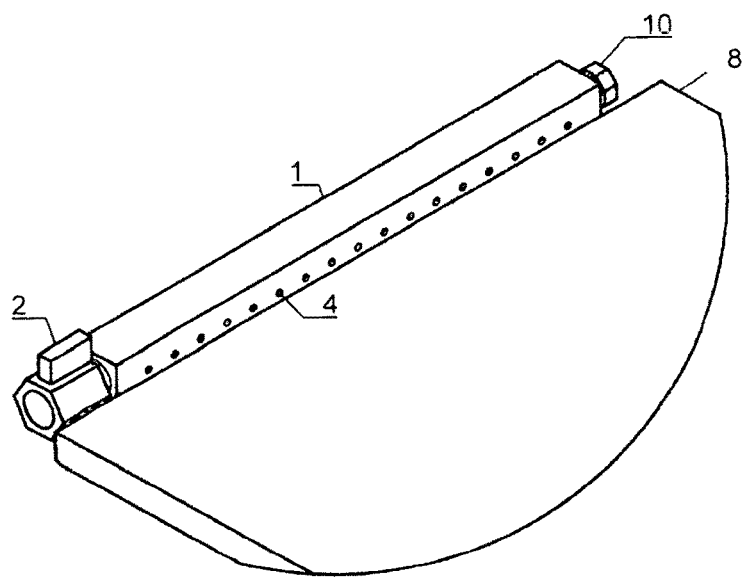
Figure 16:
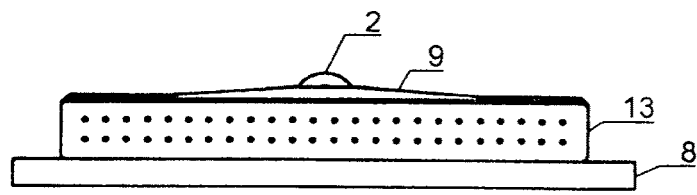
Figure 17:
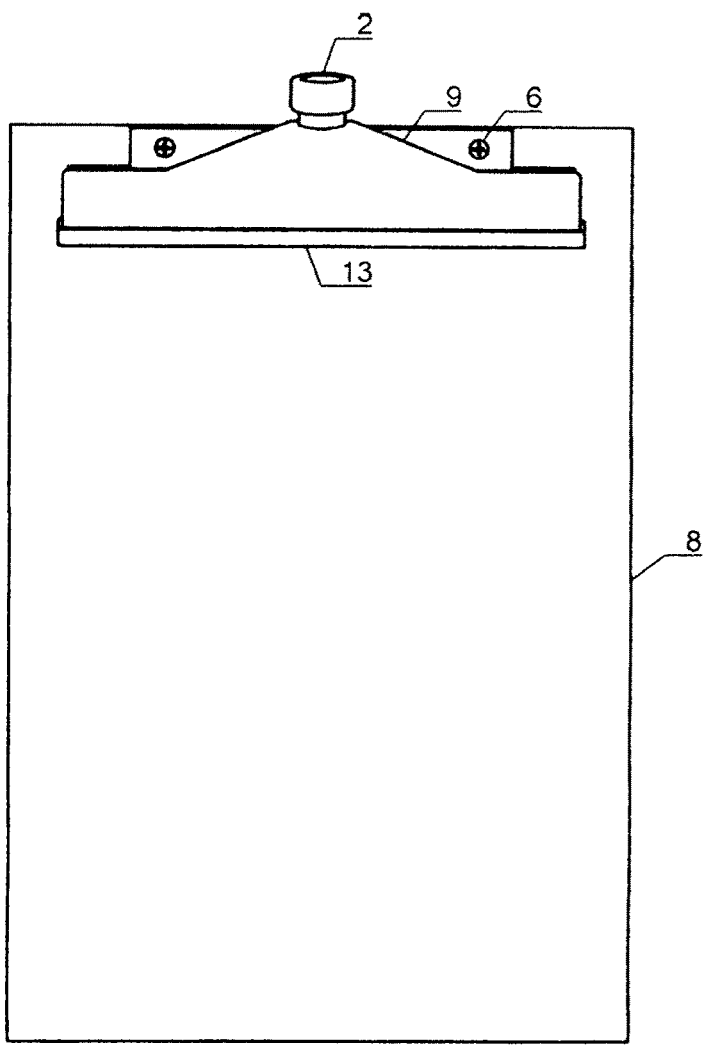
Figure 18:
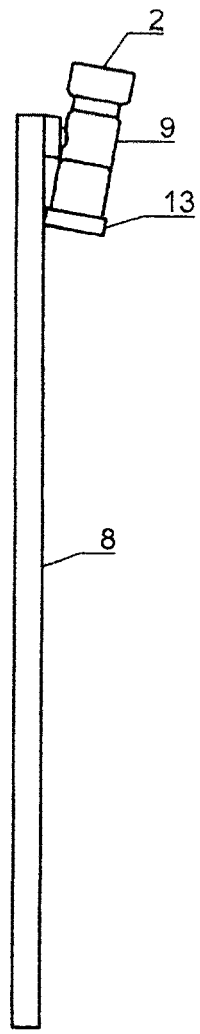
Figure 19:
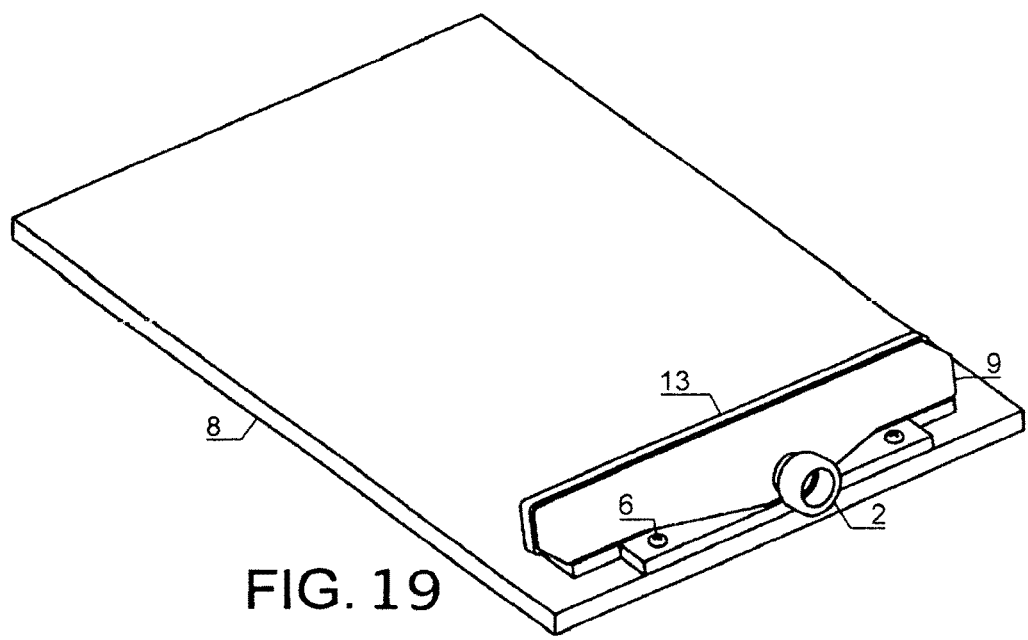
Figure 20:
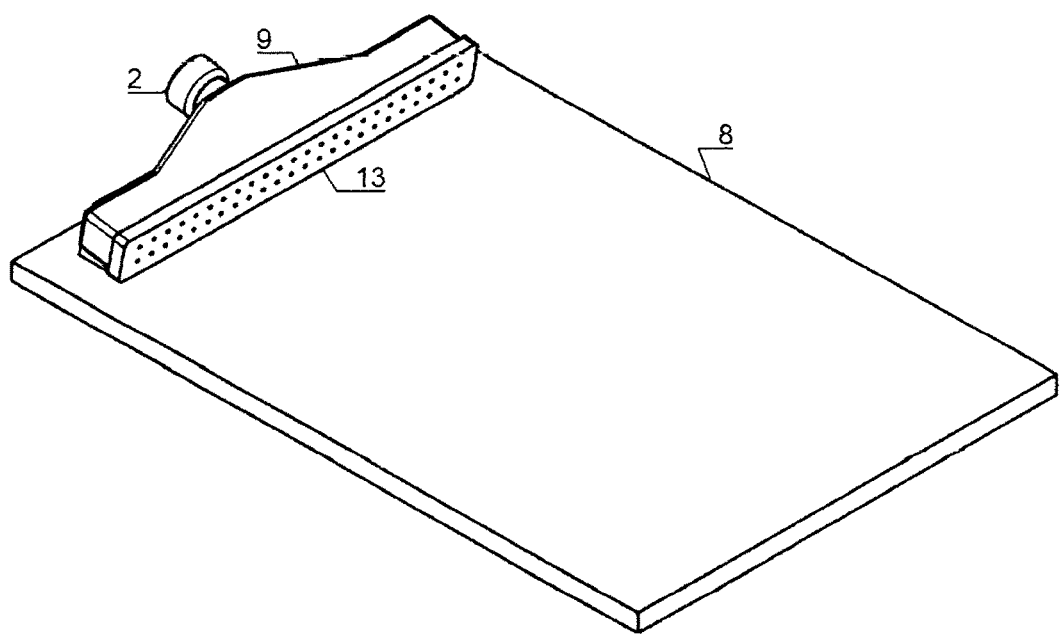
Figure 21:
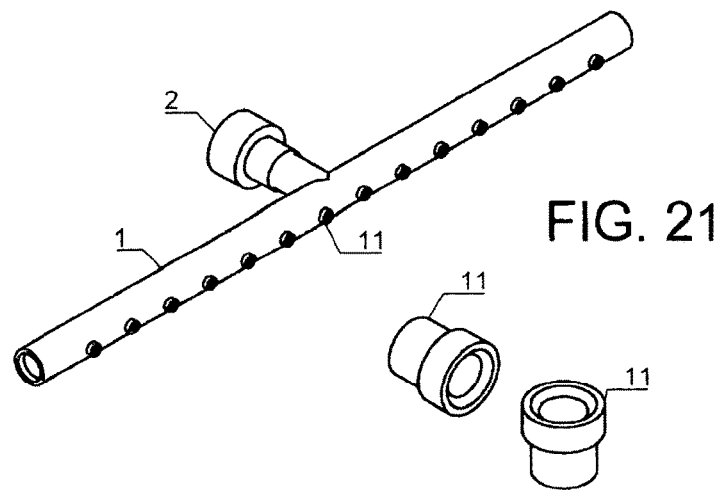
Figure 22:
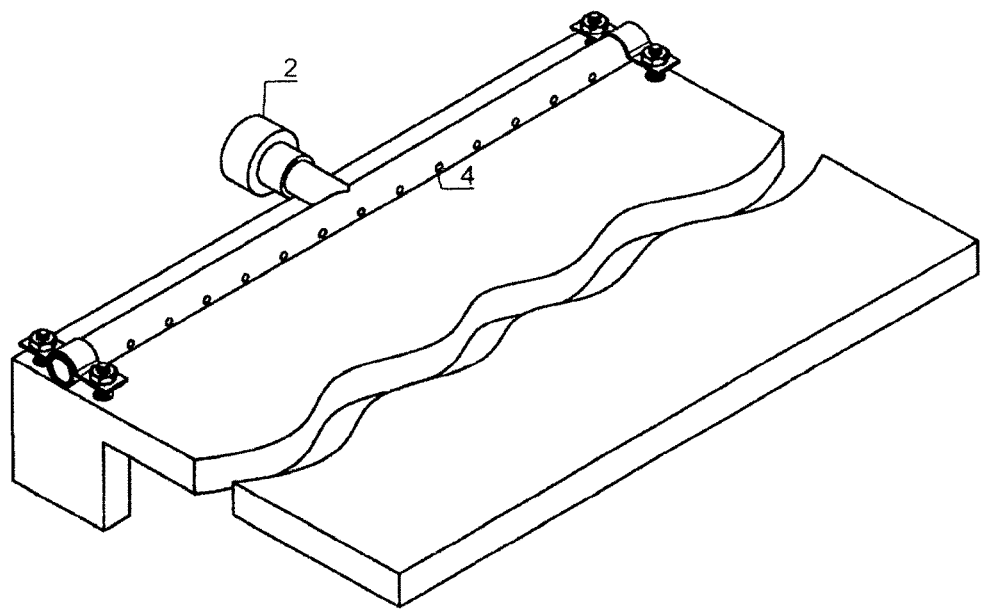
Figure 23:
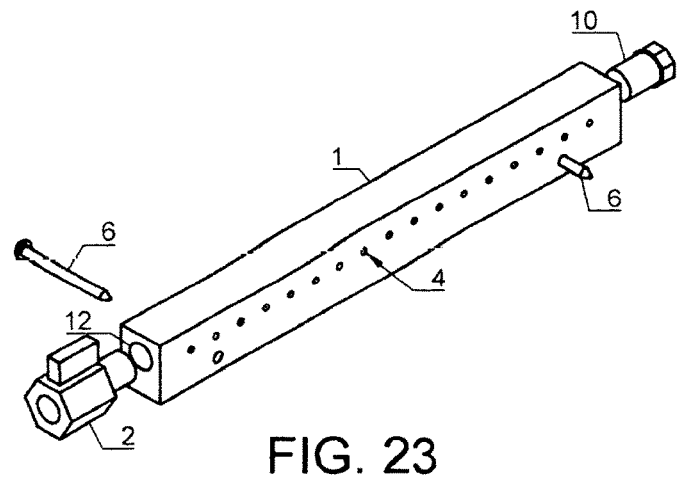
Figure 24:
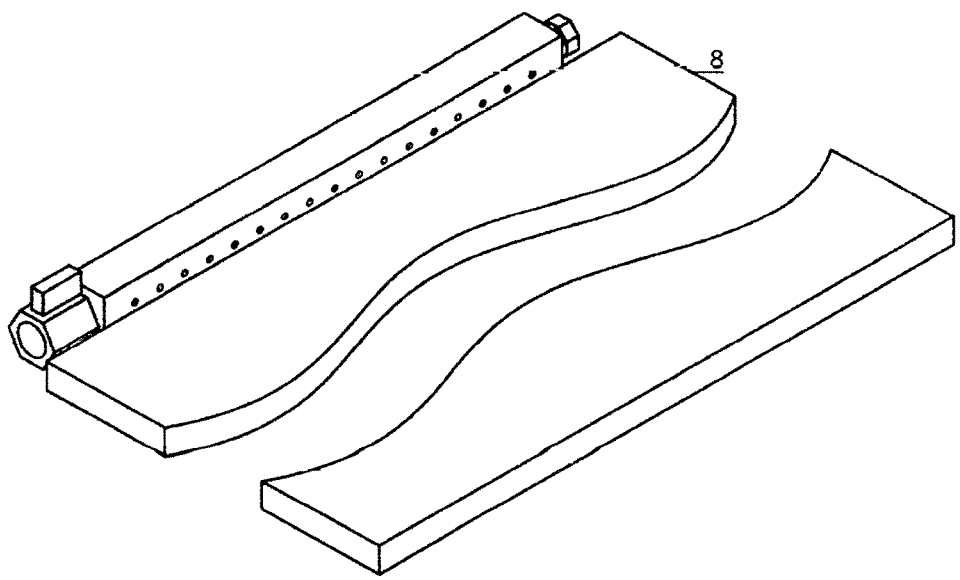

FIG. 1 is front view with water connection on the end
FIG. 2 is the top view
FIG. 3 is the side view
FIG. 4 is a prospective view with water connection on the end
FIG. 5 is a closeup prospective view of the water connection
FIG. 6 is the top view with water connection in the center
FIG. 6A is a closeup top view of one end of the water chamber
FIG. 7 is the side view
FIG. 7A is a closeup side view of one end of the water chamber
FIG. 8 is the prospective view with water connection in the center
FIG. 9 is the prospective view of one end of the water chamber
FIG. 10 is the prospective view of of the water connection
FIG. 11 is the front view of a rectangular water chamber
FIG. 12 is the top view
FIG. 13 is the side view
FIG. 14 is the prospective view of a rectangular water chamber
FIG. 15 is a prospective view of a rectangular water chamber
FIG. 16 is the front view of a plastic extrusion water chamber
FIG. 17 is the top view
FIG. 18 is the side view
FIG. 19 is the prospective view of the right side rear of a plastic extrusion water chamber
FIG. 20 is the prospective view of a left front
FIG. 21 is a prospective view of a water chamber with enlarged view of nozzle inserts.
FIG. 22 is a prospective view attached to a cutting board
FIG. 23 is an exploded prospective view of the rectangular shaped water chamber
FIG. 24 is a prospective view of rectangular water chamber attached to cutting board

ITEM NUMBER LIST DESCRIPTIONS

1—Water chamber
2—Water Connection
3—Clamp
4—Opening
5—Hardware Nut
6—Bolt/screw
7—Elevation piece
8—Cutting board
9—Plastic extruded water chamber 10—Closure piece
11—Directional nozzle
12—Bore
13—Extruded water chamber cover plate with plurality of openings

DETAILED DESCRIPTION OF THE WASH AWAY FILLET TOOL

The Wash Away Fillet Tool is a household utensil designed to be used to wash away fish slime, blood, guts, and feces from the working surface, the hands, the knife and the fish during processing.

The Wash Away Fillet Tool is comprised of two main parts:
1. The water chamber with many openings 4
2. The cutting board General Notes
1. The water chamber and the cutting board may be made in any shape and from any material.
2. The openings 4 in the water chamber may or may not be fitted with any type of device to direct the flow of water and the flow direction device may be made of any material.

Drawings 1 & 2 show the parts connected to form The Wash Away Cleaning Tool Drawings 3 through 10 show variations of the concept.

FIG. 1 and FIG. 2 generally depict a frontal view and top view respectively of an embodiment of the inventive subject matter, comprising a water chamber 1, a means for connecting the watcher chamber to a source of flowing water such as a water connection 2, a cutting board 8, and an elevation piece 7. The water chamber 1 may be a tube shape with a first closed end 14, a connection end 16, an exterior cutting board side 18, a hollow interior 20, and at least one opening 4. The water chamber 1 allows for water flowing from a connected water source to be dispersed through at least one opening in the water chamber. water chamber 1 is preferably made of a plastic or metal and has at least one opening. However, other alternatives are contemplated. For example, water chamber 1 can have one circular opening along the exterior cutting board side 18, a single opening traveling the length of the exterior cutting board side 18 of the water chamber 1, or a plurality of openings along the length of the exterior cutting board side 18 of the water chamber 1. The water connection 2 may be attached to the connection end 16 of the water chamber 1 for to allow connection of the water chamber 1 to a source of flowing water. The cutting board 8 having a cutting surface 22 and a bottom surface 24, may be removeably attached to the exterior cutting board side 18 of the water chamber 1. The cutting board 8 is attached to the water chamber 1 so that the cutting surface 22 is parallel to the opening 4 and allowing for water flowing out of the opening 4 to flow across the cutting surface 22. Means for removeable attachment may include a clamp 3 or other attachment means allowing for the cutting board 8 to be removed easily or to change the cutting board 8. In one embodiment, the clamp 3 allows for attaching the water chamber 1 to any flat surface to make the flat surface a cutting board 8. For example, the water chamber 1 may be connected to a collapsible table or a small wooden cutting board. The cutting board 8 provides a surface for filleting fish. Optionally, one embodiment may comprise a elevation piece 7 that may be comprised of any material with minimal thickness to provide more elevation to the water chamber 1 so that the water exiting the water chamber will flow from one end of the cutting board 8 to the opposite end. The elevation piece 7 may be connected to the water chamber 1 or the cutting board 8 using a hardware nut 5 and a bolt/screw 6 or by any permanent or removeable attachment means. FIG. 1 shows the elevation piece 7 attached to the bottom surface 24 of the cutting board 8.

FIG. 2 depicts a top view of an embodiment of the inventive subject matter showing the cutting surface 22 of the cutting board 8. The cutting surface 22 provides a place for the filleting the fish and allows a surface for the water to flow over that is exiting the water chamber 1. The water flowing out of the water chamber flows from a first end 26 of the cutting board 8 to a second end 28 of the cutting board 8. The flow from the first end 26 to the second end 28 is caused by water pressure when the water exits the water chamber and/or by gravity when the elevation piece 7 is attached near the first end 26 of the cutting board 8, causing the first end 26 to be at a higher elevation than the second end 28.

FIG. 3 depicts a side view of an embodiment. The connection end 16 of the water chamber 1 is shown having a water connection 2 where in the hollow interior 20 of the water chamber 1 can be seen.

How to Use the Wash Away Fillet Tool
1. Place fillet tool anywhere such as the tailgate of pick-up truck, the top of an ice chest, on a counter top, or across a sink.
2. Connect a water hose to fillet tool.
3. Turn the water on.
4. The water flow direction is across the working surface parallel to and away from the person using the fillet tool.
5. Place fish, game, meat, or any food that one might prepare on a cutting board and go to work. The flowing water washes the waste off the working surface of the tool, the hands, the knife and the fish.

The Wash Away Fillet Tool is an improvement to prior art in multiple ways.
1. The novel addition of the water chamber attached directly to a cutting board with the plurality of opening arranged to cause water to flow directly across the top of the board which is the working surface of the tool is an improvement on prior art that sets The Wash Away Fillet Tool apart from anything like it. The improvement lies in the fact that water flowing across the cutting board washes the undesirable material off the board without splashing or getting on the person. All Other know designs spray the water from above the cutting board onto the board and some spray from above the cutting board toward the person.
2. The Wash Away Fillet Tool is unique in that all other known prior art is either designed to be anchored down and stationary or is not easily moved. The Wash Away Fillet Tool may be carried with one hand and is not attached to anything other than a detachable water hose.
3. Innovative improvements in design eliminating unnecessary clamping parts, side boards, raised edges, slats, cross members and pans reduces the amount of the materials and labor and the cost thereof, resulting in the cost to manufacture being be dramatically reduced. This cost savings passed along to consumers will price The Wash Away Fillet Tool well within reach of the average consumer.

The Wash Away Fillet Tool is set apart from all other previous art in that it simply solves the problems.
1. Safety because the fish slime is washed away before it creates the hazard. s.

2. Food contamination because the waste of slime, bile, feces is wash away during the filleting process.
3. Poor productivity because of the running water one fish right after another can be filleted without stopping to remove the accumulated waste is time consuming
4. The cost to manufacture these handy time saving devices is so low that almost anyone will be able to afford one, certainly the average consumer.

I claim:

1. A fillet tool that uses flowing water to wash off the working surface while it is being used to fillet fish, the fillet tool comprising:
    a water chamber having a first closed end, a connection end, an exterior cutting board side, and a hollow interior;
    a means for connecting said water chamber to a source of flowing water is attached to the connection end of said water chamber;
    at least one opening on the exterior cutting board side of said water chamber, whereby water can exit the water chamber; and
    a cutting board removeably attached to the exterior cutting board side of said water chamber, the cutting board having a cutting surface and a bottom surface, wherein the cutting surface is parallel to said at least one opening of said water chamber, allowing water flowing from the water chamber out of said at least one opening to flow onto the cutting surface.

2. The apparatus of claim 1, further comprising a plurality of openings on the exterior cutting board side of said water chamber.

3. The apparatus of claim 1, wherein the water chamber is a square shape.

4. The apparatus of claim 3, wherein the cutting board having a first end and a second end is connected to the water chamber and elevation piece at the first end.

5. The apparatus of claim 1, further comprising an elevation piece attached to the bottom surface of said cutting board, wherein the elevation piece has a thickness of at least 1 centimeter.

* * * * *